United States Patent [19]

Offterdinger

[11] 4,041,786

[45] Aug. 16, 1977

[54] LINEAR MOTION DEVICES

[76] Inventor: Hermann Freidrich Offterdinger, 602 Galway Drive, Burlington, Ontario, Canada

[21] Appl. No.: 645,433

[22] Filed: Dec. 30, 1975

[51] Int. Cl.[2] .................... F16H 19/04

[52] U.S. Cl. .................... 74/29

[58] Field of Search .................... 74/29, 422

[56] References Cited

U.S. PATENT DOCUMENTS

| | | | |
|---|---|---|---|
| 522,252 | 7/1894 | Garrison | 74/422 |
| 2,555,254 | 5/1951 | Stebbins | 74/29 |
| 3,165,771 | 1/1965 | Kamborain et al. | 74/422 |
| 3,338,140 | 8/1967 | Sheesley | 74/422 |
| 3,347,109 | 10/1967 | Adams et al. | 74/422 |
| 3,771,781 | 11/1973 | Lackey | 74/422 |

*Primary Examiner*—Samuel Scott

*Assistant Examiner*—Wesley S. Ratliff, Jr.

*Attorney, Agent, or Firm*—Hirons & Rogers

[57] ABSTRACT

A linear motion device intended particularly as the elevating mechanism of a medical examination table consists of four parallel rack members on one relatively movable part each engaged by a respective pinion carried by the second relatively movable part. The pinions are mounted in pairs on two parallel shafts, the two adjacent pinions on the two shafts being adjacent the same support member mounting the shafts. Stabilizing means comprise two meshed pinions each of which meshes with a respective rack rigidly mounted on the second movable part as far as possible from the first-mentioned pinions. A pair of rollers spaced from the meshed rollers engage another rack member for stabilizing action at right angles to that provided by the meshed pinions.

7 Claims, 5 Drawing Figures

LINEAR MOTION DEVICES

FIELD OF THE INVENTION

The present invention is concerned with linear motion devices and especially, but not exclusively, to such devices for use in a patient-handling device, such as an examination table.

REVIEW OF THE PRIOR ART

Examination tables as now widely used by doctors and chiropractors are arranged to provide various adjustments of the patient's position and attitude to facilitate examination. Moreover, some of these tables are also provided with means for performing certain physical procedures on the patient. An almost universal requirement for such tables is that they permit the height of the table surface to be adjusted in accordance with the size of the patient, whether the operator is sitting or standing, the procedure to be performed, etc., such adjustment involving a vertical movement of the entire table surface. It is essential that such movement of the table top, which usually is made with the patient thereon, shall take place with a firm, steady movement, since any unsteadyness will unnecessarily agitate the patient, who commonly is already somewhat tense. The provision of a suitable inexpensive but effective linear motion device between the table top and its base has proven difficult.

DEFINITION OF THE INVENTION

It is an object of the invention to provide a new linear motion device.

It is a more specific object to provide a new linear motion device particularly suited as a mechanical connection between an examination table top and its base to permit vertical movement of the top relative to the base.

In accordance with the present invention there is provided a new linear motion device comprising first and seocnd members movable linearly relative to each other, four mutually-spaced parallel rack members carried by the first member, four mutually-spaced pinion members mounted by the second member each in engagement with a respective rack member for movement simultaneously with the other pinions along the respective rack member upon rotation about its axis, two shafts each connecting two of the pinion members for rotating simultaneously with one another, and a stabilishing member mounted by the second member a substantial distance spaced from the first-mentioned pinions and comprising at least two further pinions engaged with two different rack members and with one another.

DESCRIPTION OF THE DRAWINGS

An examination table that is a particular preferred embodiment of the invention will now be described, by way of example, with reference to the accompanying diagrammatic drawings, wherein.

DESCRIPTION OF THE PREFERRED EMBODIMENTS

The table to be described is intended for medical examinations, principally as carried out by chiropractors, and the table top is provided with a number of cushion segments 10*a* through 10*f* supported by a table top member indicated generally by the reference 12. In this embodiment the table top member comprises two parts 14 and 16 connected for movement relative to each other by motor means not specifically illustrated to change the effective length of the table top and, for example, to permit the cushion segments 10*c* and 10*d* to incline upwards as illustrated in broken lines in FIG. 1.

Figure 1:
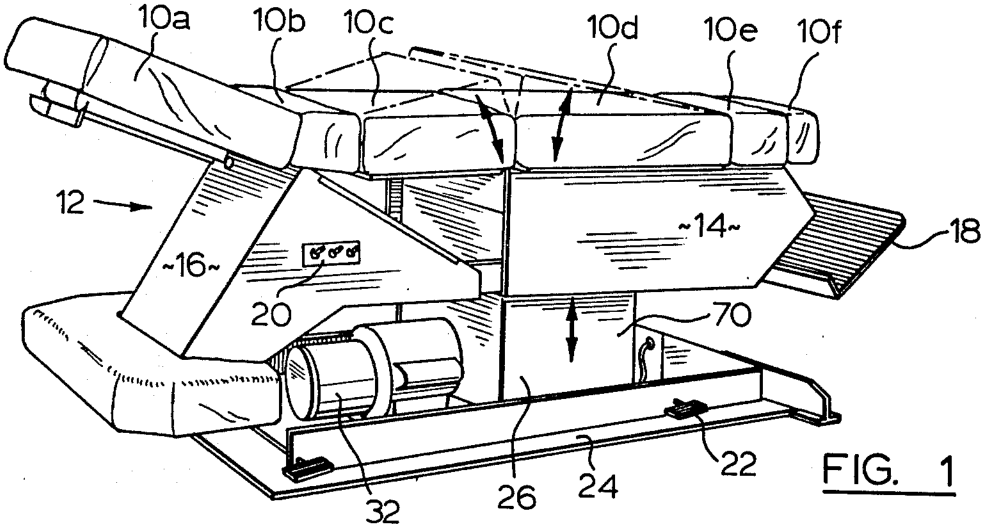
FIG. 1 is an overall perspective view of the table showing the table top in the usual generally horizontal position.
Figure 2:
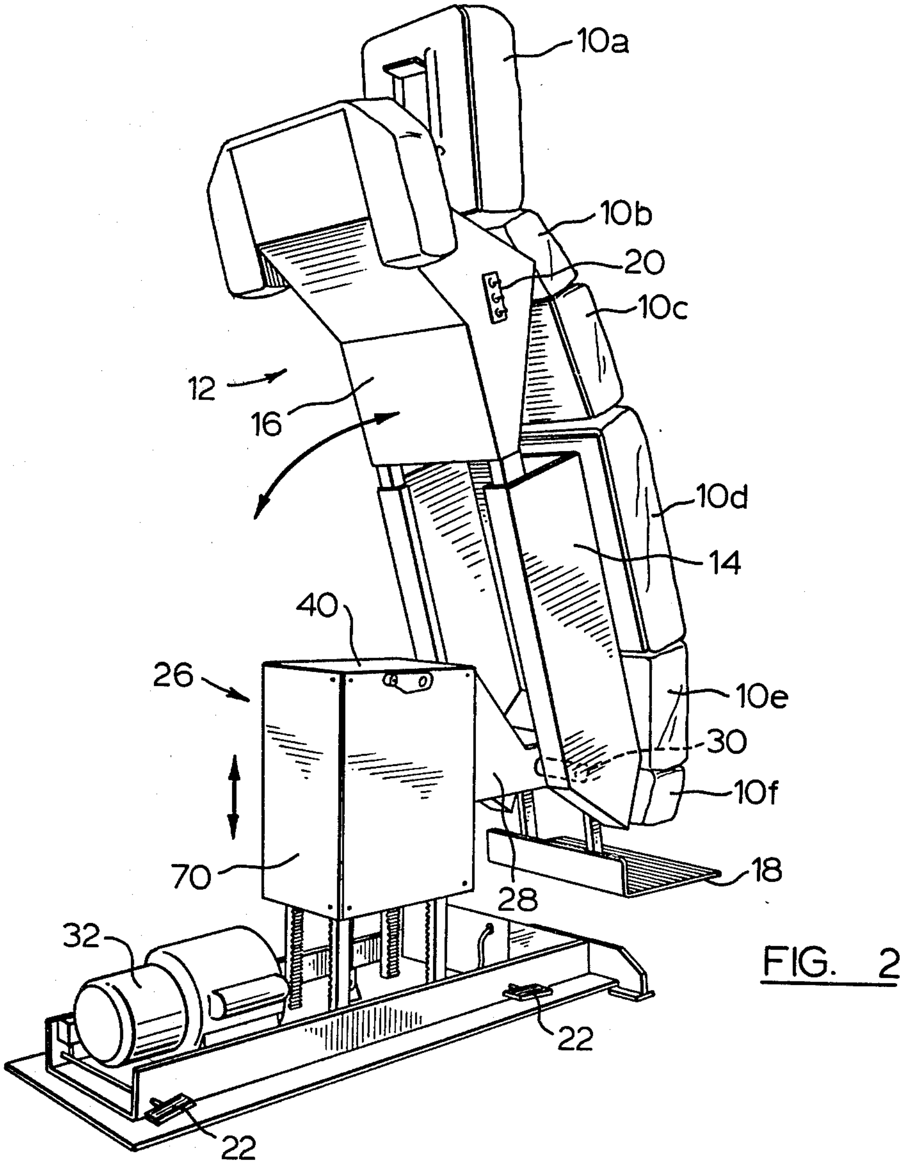
FIG. 2 is a similar view to FIG. 1 showing the table top elevated, as to receive a standing patient, to reveal the linear motion device connecting the table base and its top.
Figure 3:
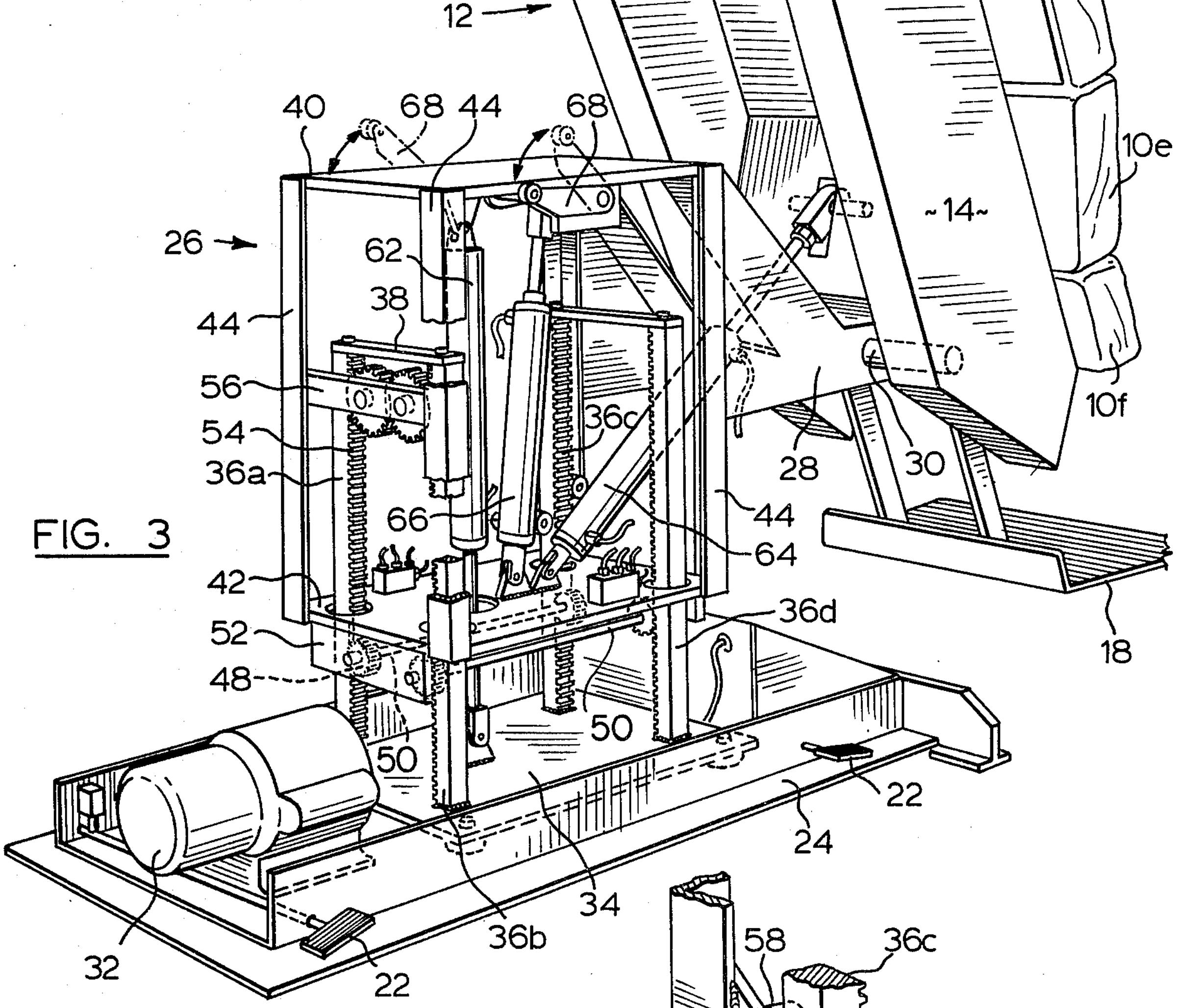
FIG. 3 is a view to an enlarged scale of part of FIG. 2 with the side panels of the linear motion device removed to show its interior.

A footrest 18 is provided at one end of the table top and the entire top can be swung from the horizontal position of FIG. 1 to the near-vertical position of FIGS. 2 and 3. All of the various movements of the table top and the relatively movable parts thereof are under the control of the operator by means of hand switches 20 or parallel foot switches 22.

The table top 12 is supported from a heavy, firm flat base indicated generally by reference 24, on which is mounted a linear motion device indicated generally by reference 26, the table top part 14 being pivoted to an extension 28 of the device 26 by a pivot 30. A motorised pump unit 32 is mounted on the base and provides pressurised hydraulic fluid under control of the various switches 20 and 22 to operate the different table movements.

Figure 5:
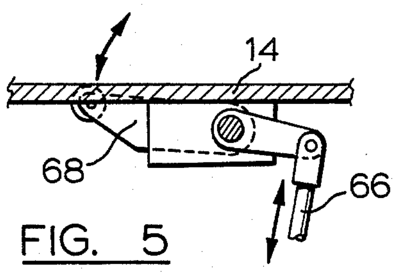
FIGS. 4 and 5 illustrate specific structural and mechanical details of the embodiment.
Figure 4:
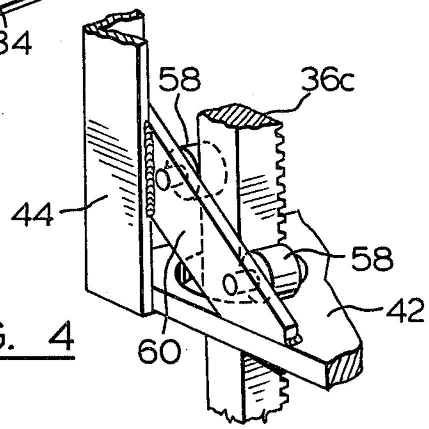

Referring now particularly to FIGS. 3 to 5, the linear motion device consists of a base plate 34 fastened to the base 24 and having four parallel mutually-spaced rack members 36*a* through 36*d* extending vertically therefrom. These rack members are disposed at the four corners of a rectangle arranged in two pairs 36*a,* 36*b* and 36*c,* 36*d* with the racks of the two members of a pair facing one another; each facing two rack members are joined at their top ends by a cross brace 38. The movable part of the linear motion member consists of a rectangular-shaped frame constituted by parallel top and bottom plates 40 and 42 respectively, and connecting corner members 44, the bottom plate having apertures through which the rack members 36 extend. Four mutually-spaced pinion members 48 are mounted in pairs on two parallel shafts 50 rotatably mounted by end plates 52 rigidly fixed to the bottom plate 42. Each two pinions immediately adjacent an end plate 52 engage facing rack members and the pinions must move together; the two pinions on one shaft must rotate together and the movable part can only move vertically up and down with the corner members 44 parallel to the rack members 36.

Completely stable and smooth movement is obtained by the action of two meshing pinions 54 carried by a cross member 56 rigidly connected between two of the corner members 44 and spaced the maximum possible distance from the pinions 48. These two pinions also mesh with the adjacent facing pair of rack members. Referring especially to FIG. 4 another of the rack members is engaged at two opposite smooth vertical sides by a pair of spaced rollers 58 rotatably mounted on a rigid brace 60; these rollers therefore stabilise the movement of the linear motion member at right angles to the stabilising action provided by the meshed pinions 54.

The required relative vertical movement of the two members of the linear motion device is produced by a hydraulic piston and cylinder unit 62 pivotably connected at its top end to the top plate 40 and at its bottom end to the base plate 34, the piston of the unit passing through a clearance hole in the bottom plate 40. The above-described tilting movement of the whole table top about the pivot 30 is produced by a hydraulic piston and cylinder unit 64 pivotably connected at its lower end to the bottom plate 42 and at its top end to the underside of the table part 14. The above-described upward movement of the cushion parts 10*c* and 10*d* is produced by a further piston and cylinder unit 66 pivotally connected at its lower end to the bottom plate 42 and at its top end to a pair of levers 68 pivotally mounted on the top plate 40. Contraction of the unit 66 causes movement of the levers 68 from the position shown in solid lines to that shown in broken lines with corresponding movement of the cushion parts, the rollers at the ends of the levers engaging the undersides of the cushion parts. In the commercial embodiment the open sides of the linear motion device are closed by removable decorative panels 70 shown removed in FIG. 3.

In this preferred embodiment two large pinions 54 are employed of a size to mesh with each other and with the respective racks; it will be seen that a chain of smaller pinions could be employed provided they are arranged to provide rotation in the required direction of the pinion meshing with the racks.

I claim:

1. A linear motion device comprising first and second members movable linearly relative to each other, four mutually-spaced parallel rack members carried by the first member, four mutually-spaced pinion members mounted by the second member each in engagement with a respective rack member for movement along the respective rack member upon rotation about its axis, two shafts each connecting two of the pinion members for rotation simultaneously with one another, and a stabilising member mounted by the second member spaced a substantial distance from the first-mentioned pinions and comprising at least two further pinions engaged with two different rack members and with one another.

2. A device as claimed in claim 1, wherein the said racks comprise two pairs with the two racks of each pair facing one another, and wherein the respective pinions engaging the two racks of each pair are mounted on different shafts.

3. A device as claimed in claim 2, wherein the said two shafts are parallel to one another.

4. A device as claimed in claim 1, wherein added stabilising means operative at right angles to the first-mentioned stabilising member comprises a pair of rollers fixed to the second member and engaging opposite sides of a rack member not engaged by the said engaged two pinions of the stabilising member.

5. A device as claimed in claim 1, wherein the said second member comprises a rectangular frame having top and bottom plates and corner connecting members, the said four pinions being mounted adjacent the bottom plate and the said two pinions of the stabilising member being mounted between two corner members between the top and bottom plates.

6. A device as claimed in claim 1, in combination with table base connected to one member, a table top connected to the other member, and means for moving the two movable members vertically up and down connected between the two members.

7. A device as claimed in claim 1, in combination with a table base on which the first member is mounted, a table top mounted on the second member for movement relative to the base, and a hydraulic motor connected between the first and second members for moving the second member and the table top vertically up and down relative to the base.

* * * * *